(12) United States Patent
Basore et al.

(10) Patent No.: US 11,205,536 B2
(45) Date of Patent: *Dec. 21, 2021

(54) REVERSE RUPTURE DISK ASSEMBLY FOR ELECTRICAL TRANSFORMER RAPID DEPRESSURIZATION AND EXPLOSION PREVENTION SYSTEM

(71) Applicant: SENTRY GLOBAL SOLUTIONS, INC., Huffman, TX (US)

(72) Inventors: Gerald D. Basore, Huffman, TX (US); William R. Kendrick, Huffman, TX (US)

(73) Assignee: SENTRY GLOBAL SOLUTIONS, INC., Huffman, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/020,633

(22) Filed: Sep. 14, 2020

(65) Prior Publication Data

US 2021/0090778 A1 Mar. 25, 2021

Related U.S. Application Data

(63) Continuation of application No. 16/691,423, filed on Nov. 21, 2019, now Pat. No. 10,811,180.

(60) Provisional application No. 62/903,523, filed on Sep. 20, 2019.

(51) Int. Cl.
*H01F 27/14* (2006.01)

(52) U.S. Cl.
CPC .................... *H01F 27/14* (2013.01)

(58) Field of Classification Search
CPC ........................................................ H01F 27/14
USPC ........................................................ 174/520
See application file for complete search history.

(56) References Cited

U.S. PATENT DOCUMENTS

| | | | |
|---|---|---|---|
| 3,667,644 A | 6/1972 | Fortman | |
| 4,315,432 A * | 2/1982 | Newton | G12B 9/02 73/431 |
| 5,082,133 A * | 1/1992 | Farwell | F16K 17/1613 137/68.21 |
| 6,230,733 B1 | 5/2001 | Strelow et al. | |
| 6,804,092 B1 * | 10/2004 | Magnier | H01F 27/14 361/38 |
| 2008/0236673 A1* | 10/2008 | Husband | F16K 17/16 137/68.22 |

(Continued)

OTHER PUBLICATIONS

United States Patent and Trademark Office, PCT/US2020/051640, Dec. 15, 2020, 15 pages, United States of America.

*Primary Examiner* — Stanley Tso (57) ABSTRACT

An electrical transformer system includes an electrical transformer and a depressurization system in fluid communication with an outlet of the electrical transformer. The depressurization system may include a rupture disk having a downwardly facing domed portion extending toward the outlet of the electrical transformer. The domed portion has an apex and a base with a retention portion surrounding the domed portion adjacent the base. A score line network extends circumferentially around the domed portion adjacent the base and spaced apart from the apex. The score line network includes a plurality of serrated score line segments and a plurality of hinge score line extending from the score line segments towards the apex of dome portion. The rupture disk may be interested into a housing assembly with a removable cover.

23 Claims, 10 Drawing Sheets

(56) References Cited

U.S. PATENT DOCUMENTS

| | | | |
|---|---|---|---|
| 2012/0012571 A1 | 1/2012 | Modena et al. | |
| 2012/0200961 A1* | 8/2012 | Magnier | H01F 27/402 |
| | | | 361/37 |
| 2014/0266529 A1* | 9/2014 | Kendrick | H01F 27/00 |
| | | | 336/105 |
| 2017/0307095 A1 | 10/2017 | Wilson et al. | |
| 2018/0051819 A1* | 2/2018 | Pittel | F16K 17/16 |
| 2019/0203845 A1* | 7/2019 | Tomasko | F16K 17/1606 |
| 2020/0009666 A1* | 1/2020 | Krebill | B23K 26/40 |
| 2020/0032919 A1* | 1/2020 | Basore | H01F 27/28 |

\* cited by examiner

REVERSE RUPTURE DISK ASSEMBLY FOR ELECTRICAL TRANSFORMER RAPID DEPRESSURIZATION AND EXPLOSION PREVENTION SYSTEM

PRIORITY

The present application is a Continuation Application of U.S. application Ser. No. 16/691,423, filed Nov. 21, 2019, which claims priority to U.S. Provisional Application No. 62/903,523, filed Sep. 20, 2019, the benefits of which are claimed and the disclosures of which are incorporated herein by reference in their entirety.

BACKGROUND

Electrical transformers are commonly found as components within a power grid used for either "stepping up" or "stepping down" voltage of an alternating current to allow for more efficient transportation of electrical power within the power grid. Transformers alter the voltage of the alternating current flowing through it by inductively coupling two conductors housed within the transformer. Specifically, both of the conductors include coils that are individually wound about a core (e.g., a silicon steel core having high magnetic flux permeability), where each coil includes a specific number of turns or windings and the change in voltage of the current flowing through the two inductively coupled conductors is proportional to the ratio of turns of the coil for each conductor.

Due to the high amount of current flowing through the two conductors of the transformer significant heat is generated internally by the transformer and thus, each conductor's coil is housed within a sealed chamber containing a coolant to prevent damaging critical components of the transformer, such as the insulation covering the individual windings for each conductor. For instance, transformers often include oil, such as mineral oil, within the sealed chamber to provide cooling to the inductively coupled conductors. In this arrangement, oil may be circulated from the chamber and through a heat exchanger to cool the oil, so it may be recirculated back into the sealed chamber to further cool the conductors. Because the oil used in cooling the conductors is often flammable, an ignition source (i.e., a spark) within the sealed chamber may ignite the oil, causing the oil to rapidly heat and expand as it vaporizes, resulting in a rapid increase in the pressure of fluid within the chamber.

For this reason, some transformers include a pressure relief valve (PRV) coupled to the chamber and configured to open in the event of an overpressurization of the chamber so as to reduce fluid pressure within the sealed chamber by releasing fluid from the chamber and to, for example, the surrounding environment. For instance, PRVs often include a spring having a stiffness corresponding to the amount of absolute pressure at which the PRV is meant to actuate. However, a period of time exists between the overpressurization event (i.e., spark and subsequent ignition) and the complete actuation of the PRV, which is sometimes referred to as the "response time" of the PRV.

More recently, rather than a pressure relief vale coupled to the transformer as described above, a depressurization fluid circuit is utilized, in which a domed, segmented burst disk is configured to burst or rupture when exposed to a predetermined differential pressure across the upstream and downstream faces of the disk. In such systems, the domed burst disk has a domed circular shape which is convex on the downstream or "dry" face of the disk and concave on the upstream or "wet" face of the disk. The dome is segmented (usually into six equivalent segments) by score lines extending from the apex of the dome to the peripheral edge of the dome. At the base of the dome is a circular retention portion formed of a thin metal sheet, which retention portion is clamped between two opposing circular flanges. As pressure within the transformer increases, pressurized fluid in the transformer, which may be in the form of liquid, gas or both, applies a force to the concave face of the burst disk. Where the fluid pressure is great enough, reaching a predetermined burst pressure, the dome will tear along one or more of the score lines extending from the apex, thereby rupturing to allow relief of the pressure within the transformer.

During normal operations, fluid pressures within the transformer fluctuate below the burst pressure as the oil within the transformer heats and cools, the result being that the concave face of the burst disk is constantly subject to fluctuating pressures. Moreover, it will be appreciated that the burst disk oriented as described above is always under tension because fluid pressure in the transformer is always applying pressure to the concave face of the dome. As such, pressure fluctuations simply increase tension on the burst disk, and in particular the score lines of the disk. Since the burst disk is constantly in a state of tension, these pressure fluctuations can cause the score lines to rupture prematurely. Moreover, in the prior art utilizing a burst disk with score lines as described, pressure pulses from pressure fluctuations are most likely to be initially most concentrated at the apex of the disk, thus further enhancing the likelihood of early rupture of the burst disk system of the prior art.

BRIEF DESCRIPTION OF THE DRAWINGS

For a detailed description of exemplary embodiments, reference will now be made to the accompanying drawings in which.

DETAILED DESCRIPTION

In the drawings and description that follow, like parts are typically marked throughout the specification and drawings with the same reference numerals. The drawing figures are not necessarily to scale. Certain features of the invention may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to". Any use of any form of the terms "connect", "engage", "couple", "attach", or any other term describing an interaction between elements is not meant to limit the interaction to direct interaction between the elements and may also include indirect interaction between the elements described. The term "fluid" may refer to a liquid or gas and is not solely related to any particular type of fluid such as hydrocarbons. The terms "pipe", "conduit", "line" or the like refers to any fluid transmission means. The various characteristics mentioned above, as well as other features and characteristics described in more detail below, will be readily apparent to those skilled in the art upon reading the following detailed description of the embodiments, and by referring to the accompanying drawings.

Disclosed herein are embodiments of a depressurization system configured for use with an electrical transformer wherein the depressurization system utilizes a domed rupture disk positioned so that the domed portion of the rupture disk extends towards the sealed chamber of a transformer. In one or more embodiments, the burst disk is provided with score lines limited to the outer edge of the burst disk, with the dome of the burst disk being free of score lines. Embodiments of the depressurization system may include a rupture disk housing assembly deployed in-line along duct piping, where the housing assembly includes a removable cover and is disposed to receive a rupture disk cartridge with a rupture disk oriented as described.

Figure 1A:
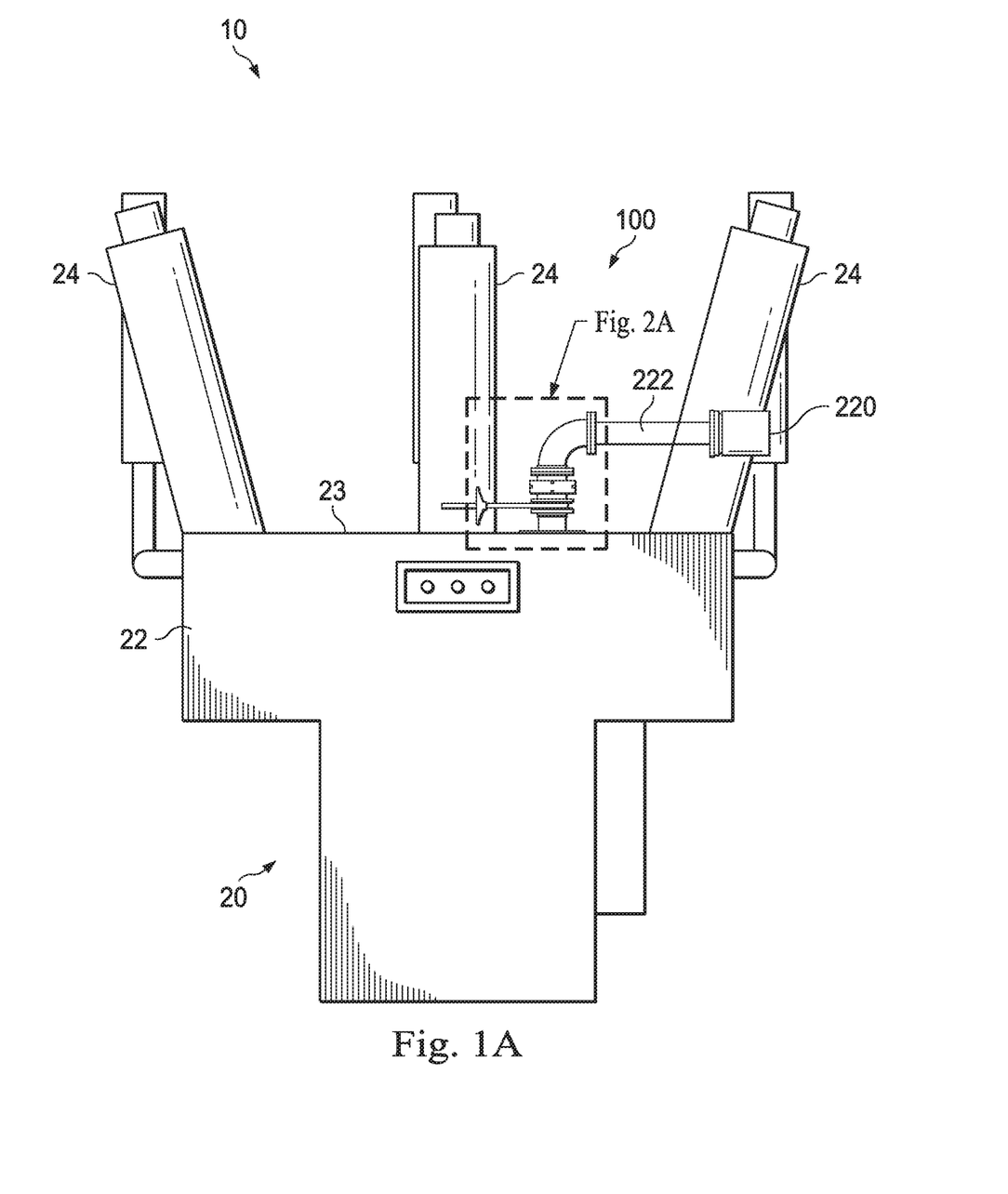
FIG. 1A is a front elevation view of an electrical transformer system in accordance with the teachings herein.
Figure 1B:
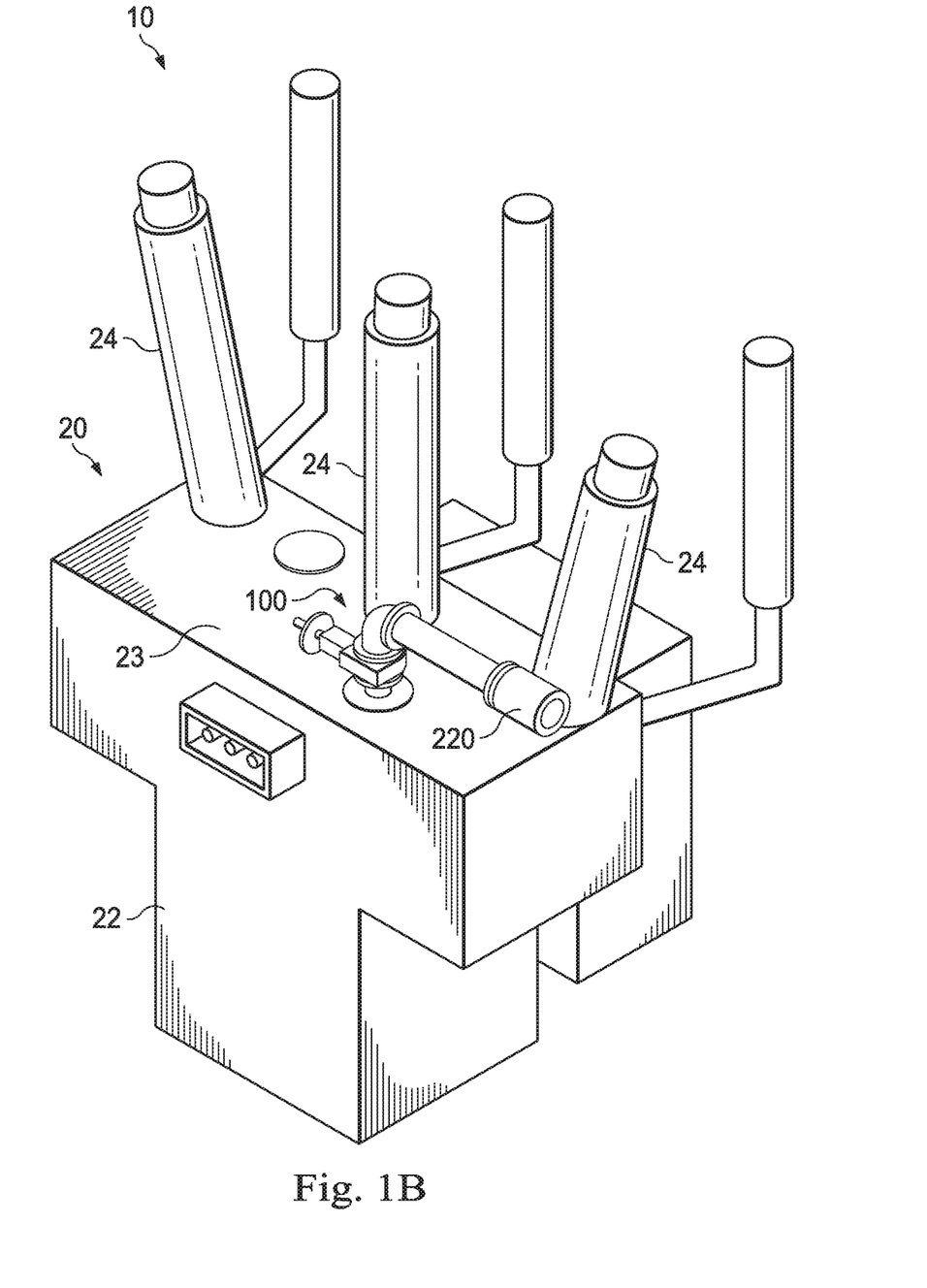
FIG. 1B is a perspective view of the depressurization system of FIG. 1A.

Referring initially to FIGS. 1A-1B, an electrical transformer system 10 is shown that includes an electrical transformer 20 having an embodiment of a depressurization system 100 coupled thereto. The transformer 20 includes a sealed chamber 22 having a generally upwardly facing surface 23, electrical cables 24 and depressurization system 100. Sealed chamber 22 includes a magnetic core (not shown) and electrical conductors (not shown) disposed in a coolant (not shown) as is generally, understood in the art. In the illustrated embodiment of transformer 20, the coolant contained within chamber 22 is mineral oil. However, in other embodiments chamber 22 may include other forms of coolant. In some embodiments, chamber 22 contains more than 1,000 gallons of coolant. It will be appreciated that depressurization system 100 may be utilized with any transformer and the above described electrical transformer 20 is for illustrative purposes only.

During operation, a high amount of alternating current flows through electrical cables 24 to the conductors housed within chamber 22, generating and transferring heat to the coolant disposed therein. Sealed chamber 22 also includes a manhole 26, which includes an opening (not shown) that is configured to provide for fluid communication between chamber 22 and depressurization system 100. Thus, fluid pressure contained within chamber 22 may be communicated to depressurization system 100 via manhole 26. In one or more embodiments, manhole 26 is provided in upwardly facing surface 21. During the operation of transformer 20, an ignition event, such as a spark, may take place within chamber 22, which may result in the combustion of at least a portion of the coolant within chamber 22, rapidly elevating the fluid pressure within chamber 22 and communicated to depressurization system 100.

Figure 2A:
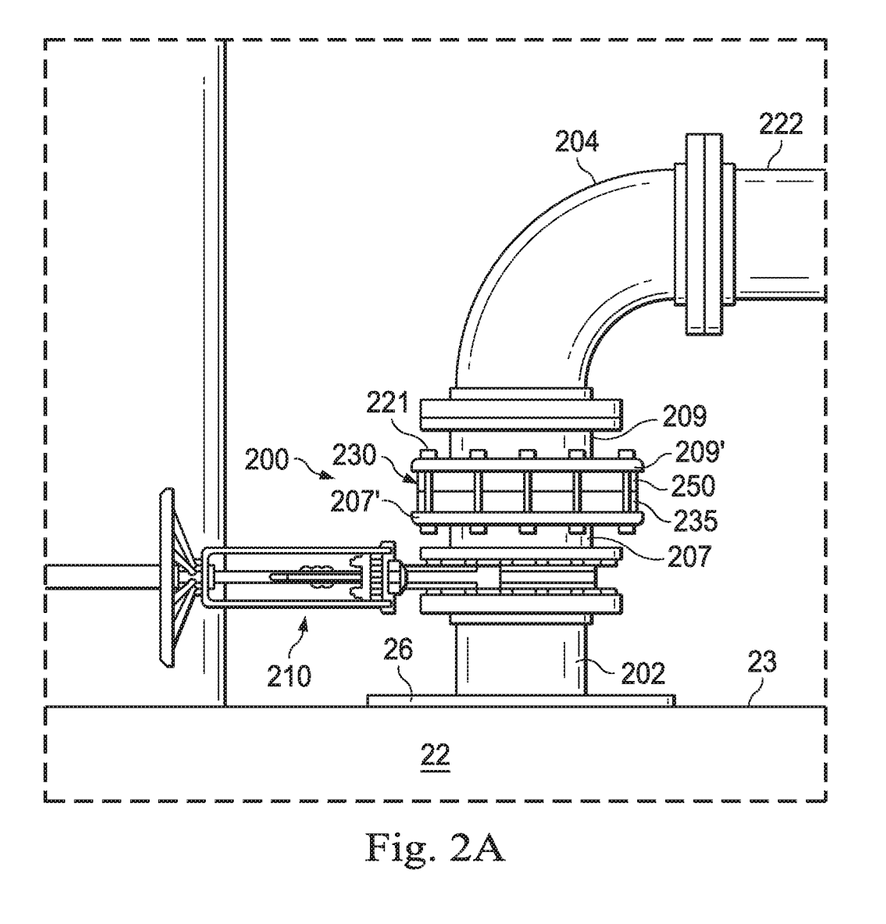
FIG. 2A is a side elevation view of one embodiment of a depressurization system denoted by line A in FIG. 1A.
Figure 2B:
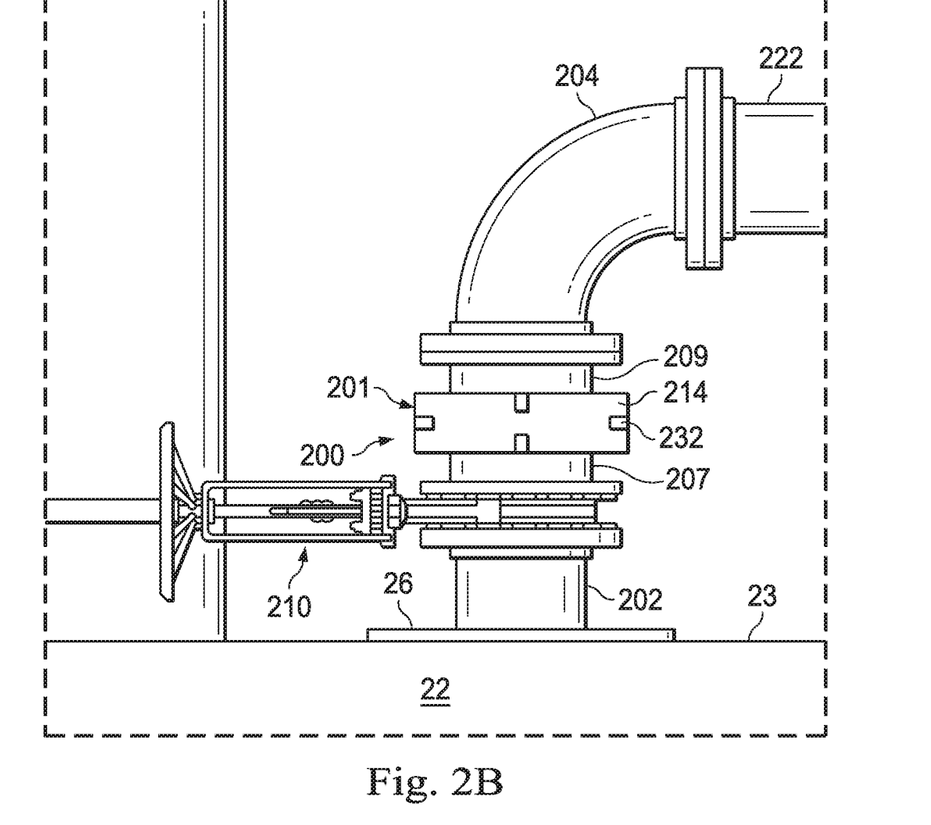
FIG. 2B is a side elevation view of another embodiment of a depressurization system denoted by line A in FIG. 1A.

Referring now to FIGS. 2A-2B, embodiments of a portion of depressurization system 100 of FIGS. 1A and 1B are shown in more detail as attached to transformer 20, and in particular, the rupture disk assembly 200 of depressurization system 100. In FIG. 2A, a rupture disk assembly 200 is shown coupled in-line along a flow path defined by a first pipe section 202 and a second pipe section 204. In one or more embodiments, as illustrated, first pipe section 202 may be a riser and second pipe section 204 may be an elbow or another riser. In one or more embodiments, first pipe section 202 is substantially straight or linear to minimize flow impedance along the flow path between first pipe section 202 and chamber 22. In this regard, first pipe section 22 may be relatively short so that rupture disk assembly 200 is in close proximity to chamber 22. For example, pipe section 202 may be linear and of approximately five (5) feet or less, ensuring that rupture disk assembly 200 is in close proximity to chamber 22. In this regard, linear pipe section 202 may extend from upwardly facing surface 23 of chamber 22 such that rupture disk assembly 200 is in close proximity to chamber 22. In one or more embodiments, an additional valve 210 may be provided along first pipe section 202 between transformer 20 and depressurization system 100. Although not limited to a particular type of valve, in the illustrated embodiment, valve 210 is shown as a gate valve, more particularly a knife gate valve, which, it will be appreciated, can be closed in order to isolate depressurization system 100 from fluid flow along first pipe section 202, such as would be desired when performing maintenance on depressurization system 100.

In FIG. 2A, rupture disk assembly 200 includes a rupture disk cartridge assembly 230 bolted in-line between a first support fitting 207 extending from first pipe section 202 and a second support fitting 209 extending from second pipe section 204, One or both support fittings 207, 209 may be integrally formed with their corresponding pipe section 202, 204, respectively, or separate fittings sized and disposed to engage rupture disk cartridge assembly 230. In this regard, first support fitting 207 includes a flange 207' and second support fitting 209 includes a flange 209'. Disk cartridge assembly 230 is shown as having a lower disk support plate 235 and an upper disk support plate 250 which are joined together between flanges 207', 209' and secured by fasteners 221 extending through flanges 207', 209' so as to sandwich lower and upper disk support plates 235, 250 therebetween.

Figure 4A:
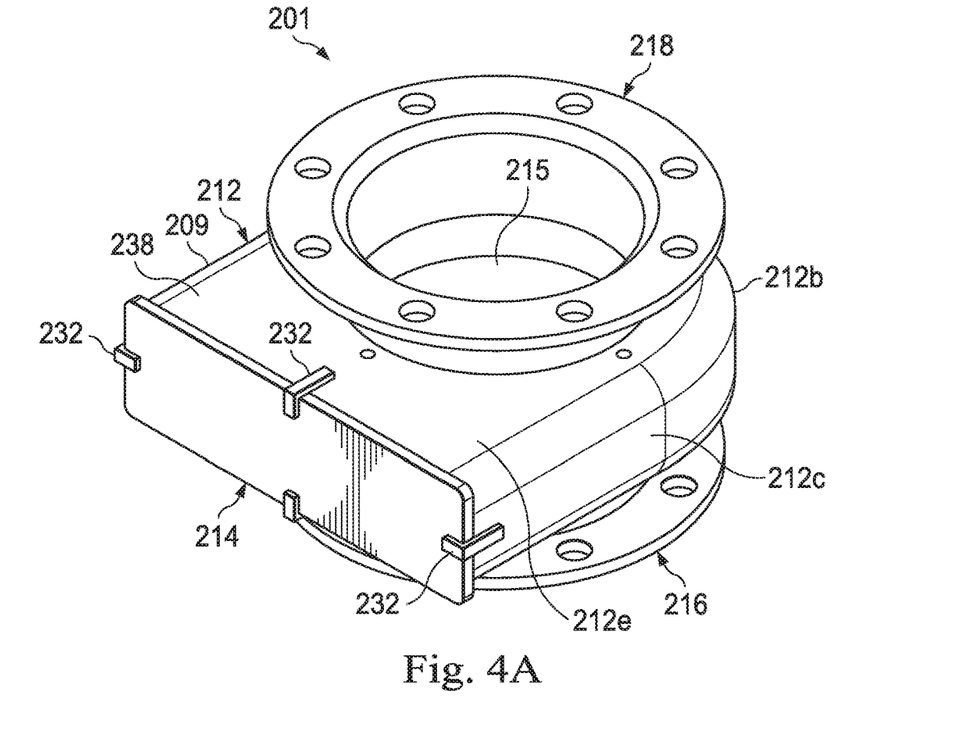
FIG. 4A is a perspective view of a rupture disk housing assembly in accordance with the teachings herein.

In FIG. 2B, rupture disk assembly 200 incudes a rupture disk housing assembly 201 bolted in-line between a first support fitting 207 extending from first pipe section 202 and a second support fitting 209 extending from second pipe section 204. One or both support fittings 207, 209 may be integrally formed with the housing assembly 201 (see FIG. 4), or separate fittings sized and disposed to engage housing assembly 201. Housing assembly 201 includes a removable cover 214 releasably secured by fasteners 232 to allow a rupture disk cartridge assembly 230 (see FIG. 2A) to be inserted therein.

Figure 3A:
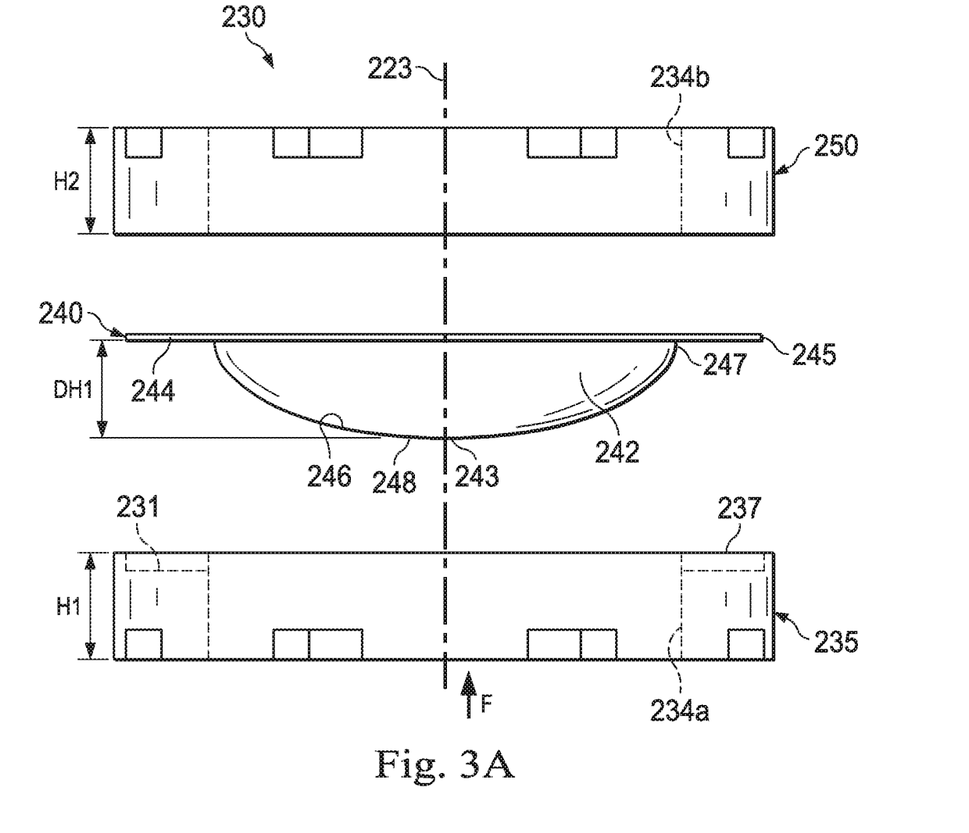
FIG. 3A is an exploded side elevation view of an embodiment of a rupture disk assembly in accordance with the teachings herein.

Turning more specifically to FIG. 3A, rupture disk cartridge assembly 230 of depressurization system 100 (see FIGS. 1A and 1B) is shown in more detail. In the illustrated embodiment, disk cartridge assembly 230 includes a rupture disk 240 having a downwardly facing domed portion 242 which is spherical in shape and which has a concave side or surface 246, which is a downstream side, and convex side or surface 248, which is an upstream side. For purposes of orientation and illustration, an arrow F is shown to illustrate fluid pressure applied to rupture disk 240 in a deployed orientation, and more specifically, fluid pressure F applied to the convex side 246. Domed portion 242 is characterized by an apex 243 and a base 247. Rupture disk 240 further include a retention portion 244 surrounding the domed portion 242 adjacent the base 247 of domed portion 242. Each of domed portion 242 and retention portion 244 may have a circular shape about axis 223. As used herein, "downwardly" facing means that the domed portion extends in a direction back along the flow path towards the electrical transformer 20 and sealed chamber 22, such that the convex side 248 of the rupture disk is in fluid communication with the sealed chamber 22, regardless of the particular orientation of rupture disk 240. Moreover, in one or more embodiments, rupture disk 240 is in close proximity to sealed chamber 22 to minimize the length of the flow path between sealed chamber 22 and rupture disk 240. Similarly, first pipe section 202 is preferably a linear pipe section, again to minimize impedances in the flow path between the sealed chamber 22 and rupture disk 240.

Rupture disk cartridge assembly 230 further includes a lower disk support plate 235 and a upper disk support plate 250. Each support plate 235, 250 has a bore 234a, 234b, respectively, formed therein along cartridge axis 223 of rupture disk cartridge assembly 230. One or both support plates 235, 250 may be a circular ring. Rupture disk 240 is secured between the lower and upper support plates 235, 250, respectively and oriented so that domed portion 242 extends downward into bore 234a of lower or lower disk support plate 235. In particular, retention portion 244 of rupture disk 240 is clamped between lower support plate 235 and upper support plate 250 to secure rupture disk 240. In some embodiments, lower disk support plate 235 is sufficiently elongated or tubular in shape with a height H1 to receive and protect rupture disk 240 extending therein. In particular, in one or more embodiments, height H1 of lower disk support plate 235 is selected to be greater than the height D1 of domed portion 242 of rupture disk 240. In one or more embodiments, upper disk support plate 250 may be a circular ring and have a height H2, which may be less than the height H1 of lower disk support plate 235. In other embodiments, height H2 of upper support plate 250 may be equal to or greater than the height H1 of lower disk support plate 235. In some embodiments, lower disk support plate 235 may have a recess 231 disposed in surface 237 thereof that complements a perimeter shape 245 of retention portion 244 for aligning rupture disk 240 about axis 223. In any event, in some embodiments, lower disk support plate 235 attaches to upper disk support plate 250 so as to clasp retention portion 244 therebetween, while in other embodiments, rupture disk cartridge assembly 230 may be simply clamped between adjacent flanges 207', 209', securing lower disk support plate 235 and upper disk support plate 250, and thus, rupture disk 240, therebetween, such as is shown in FIG. 2A.

Figure 3B:
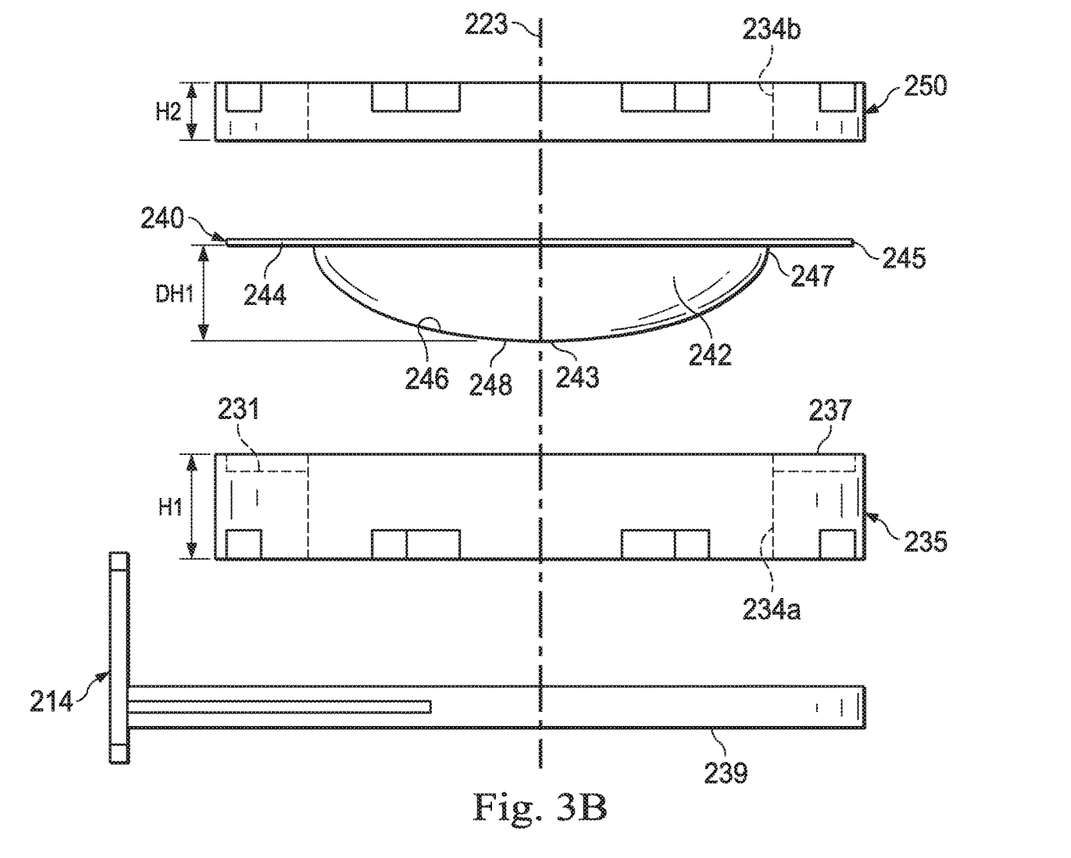
FIG. 3B is an exploded side elevation view of another embodiment of a rupture disk assembly in accordance with the teachings herein.

With reference to FIG. 3B, another embodiment of rupture disk cartridge assembly 230 is illustrated, where rupture disk housing 230 as shown in FIG. 3B is particularly well suited for insertion into rupture disk housing assembly 201 generally depicted in FIG. 2B. As described above, disk cartridge assembly 230 includes a rupture disk 240 which is secured between the lower and upper disk support plates 235, 250, respectively and oriented so that domed portion 242 extends downward into bore 234a of first or lower disk support plate 235. In embodiments where rupture disk cartridge assembly 230 is to be inserted into a rupture disk housing assembly 201, rupture disk cartridge assembly 230 may further include a base 239 supporting first or lower disk support plate 235. In one or more embodiments, base 239 and lower support plate 235 may be integrally formed, while in other embodiments, lower support plate 235 may be separate from base 239 but supported by base 239.

Figure 4B:
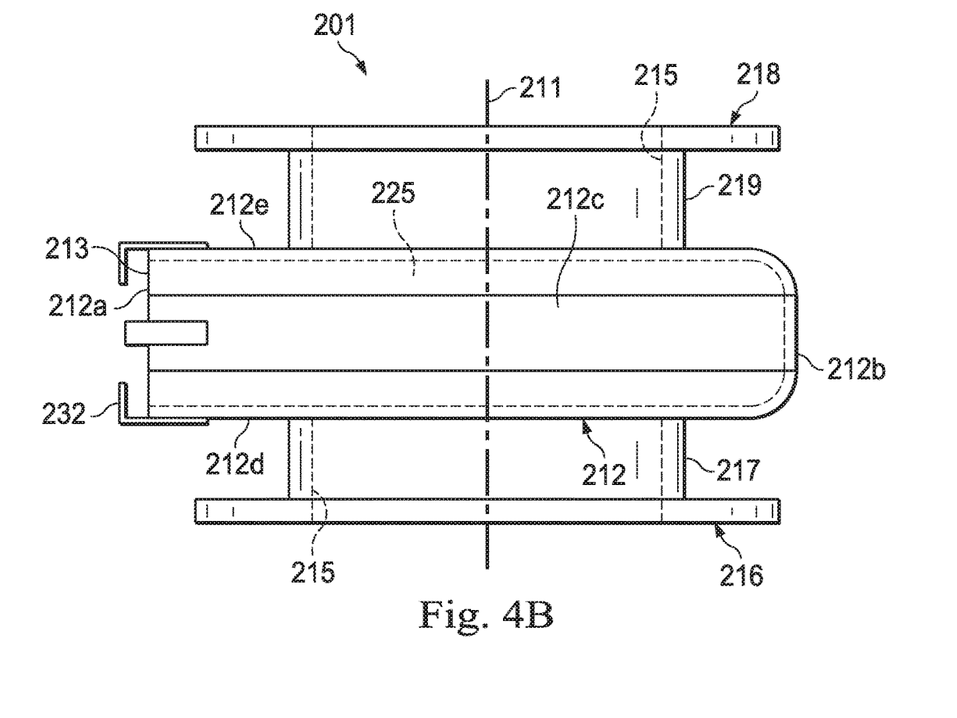
FIG. 4B is a side elevation view of the rupture disk housing assembly of FIG. 3A.
Figure 4C:
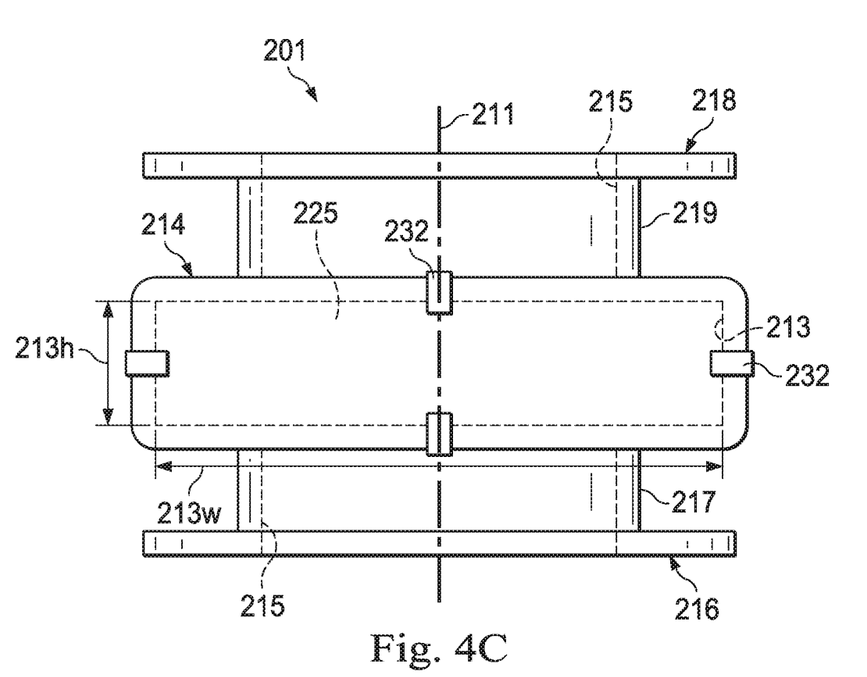
FIG. 4C is a front elevation view of the rupture disk housing assembly of FIG. 3A.

With reference to FIGS. 4A-4C and on-going reference to FIGS. 2B and 3B, housing assembly 201 generally includes a container 212 to which a removable cover 214 is secured. Container 212 includes an opening 213 enclosed by removable cover 214. Opening 213 has a height 213h and a width 213w and extends into an internal cavity 225 formed within container 212. Housing assembly 201 further includes a first or lower flange 216, and a second or upper flange 218. In one or more embodiments, first flange 216 is disposed for attachment to first pipe section 202 (see FIG. 2B) and second flange 218 is disposed for attachment to second pipe section 204 (see FIG. 2B). A through bore 215 is formed to extend between first flange 216 and second flange 218 along axis 211 and intersects cavity 225 for communicating fluid flow between first pipe section 202 and second pipe section 204. In the illustrated embodiment, first flange 216 connects to a first surface 212d of container 212 via first housing riser 217 and second flange 218 connects to a second surface 212e of container 212 via second housing riser 219. In one or more embodiments, housing assembly 201 has a low profile selected to correspond generally with the approximate height DH1 of a rupture disk 240 to be inserted into container 212. Thus, container 212, and specifically, internal cavity 225, is sized in shape and dimension to receive a cartridge disk assembly 230 as described in more detail below.

It will be appreciated that when disk cartridge assembly 230 is seated in disk housing assembly 201 as described herein, cartridge axis 223 and housing axis 211 substantially align so that bore 215 of housing assembly 201 and bores 234a, 234b of disk cartridge assembly 230 are likewise aligned as described herein. In one or more embodiments, lower disk support plate 235 may include splines 236 along one or both sides 235a thereof for engagement with complementing grooves (not shown) on internal sidewalls of container 212 for leveling rupture disk cartridge assembly 230 during insertion into rupture disk housing assembly 201. However, it will be appreciated that other structures may be used to facilitate insertion of lower disk support plate 235 and/or disk cartridge assembly 230 into container 212.

In one or more embodiments, as illustrated, removable cover 214 may be attached to lower disk support plate 235, while in other embodiments, removable cover 214 may be separate from lower disk support plate 235. In the illustrated embodiment, fasteners 232 may be utilized to secure removable cover 214 to container 212. In one or more embodiments, fasteners 232 may be housing weldments attached to the outside surface 238 of container 212 about opening 213 to secure rupture disk cartridge assembly 230 within housing assembly 201 by extending over removable cover 214 preventing removal thereof. In any event, removable cover 214 functions to enclose opening 213 of container 212 and prevent removal of disk cartridge assembly 230 therefrom.

In the illustrated embodiment, four fasteners 232 are shown. However, it will be appreciated that any number of housing fasteners 232 may be used. Moreover, while housing weldments are illustrated, it will be appreciated that fasteners 232 may include, without limitation, pins, bolts, screws, clamps or other devices.

As described above, in one or more embodiments, container 212 has a low-profile shape with a height to width ratio substantially the same as the height to width ratio (213h:213w) of opening 213 where the width 213w is greater than the height 213h. In some embodiments, the width 213w is greater than twice the height 213h, while in other embodiments, the width 213w is equal to or greater than four times the height 213h. In one or more embodiments, container 212 has a front side 212a in which opening 213 is formed, an opposing back side 212b with side walls 212c extending between front side 212a and back side 212b. In one or more embodiments, front side 212a is substantially flat and back side 212b is semicircular. In one or more embodiments, back side 212b is semicircular around housing axis 211.

Referring back to FIGS. 1A and 1B, in one or more embodiments, depressurization system 100 may include a substantially horizontal, elongated pipe 222 coupled to second pipe section 204 (see FIGS. 2A and 2B). Elongated pipe 222 may function as an expansion reservoir for sealed chamber 22 when an ignition event occurs that results in rupture of rupture disk 240 (see FIGS. 3 and 4), allowing liquid from sealed chamber 22 to temporarily flow into elongated pipe 222 via rupture disk assembly 200. In some embodiments, while elongated pipe 222 is substantially horizontal, it may have a slight incline from the horizon so that any liquid that temporarily expands into elongated pipe 222 will thereafter drain back into sealed chamber 22. In one or more embodiments, the incline is between 1 degree and 15 degrees with the horizontal.

As will be appreciated, accompanying any liquid that might flow into elongated pipe 222 may be ignition gasses. Thus, a flame suppressor 220 may be disposed at the end of elongated pipe 222. In one or more embodiments, flame suppressor 220 may be aligned with pipe 222 and each is oriented substantially horizontally so that an outlet therefrom faces sideways. In other embodiments, flame suppressor 220 may have a different orientation, such as a vertical orientation. The disclosure is not limited to a particular orientation of flame suppressor 220.

In the above described embodiments, pipe 222 is selected to be sufficiently long to temporarily receive oil (not shown) from transformer 20 during an overpressurization event. As stated, in some embodiments, pipe 222 may be constructed on a slight angle between the two ends of pipe 222 with the lower end coupled to second pipe section 204 so as to be inclined toward housing assembly 201 to allow oil to drain back into transformer 20 after the overpressurization event. In one or more embodiments, transformer 20 is in a building, or other structure, and pipe 222 passes to an outside of the building, or other structure, before connecting to flame suppressor 220. In one or more embodiments, electrical transformer system 10 includes an oil collection tank (not shown) connected to pipe 222 at a T-junction allowing oil to collect via gravity into the oil collection tank while gas is routed to flame suppressor 220. In the illustrated embodiment, burning gases may also travel along elongated pipe 222 and be released from the end of elongated pipe 222 into flame suppressor 220. Flame suppressor 220 is not limited to a particular type but may be any device that functions to suppress flames that may accompany the release of gases from elongated pipe 222.

Figure 5A:
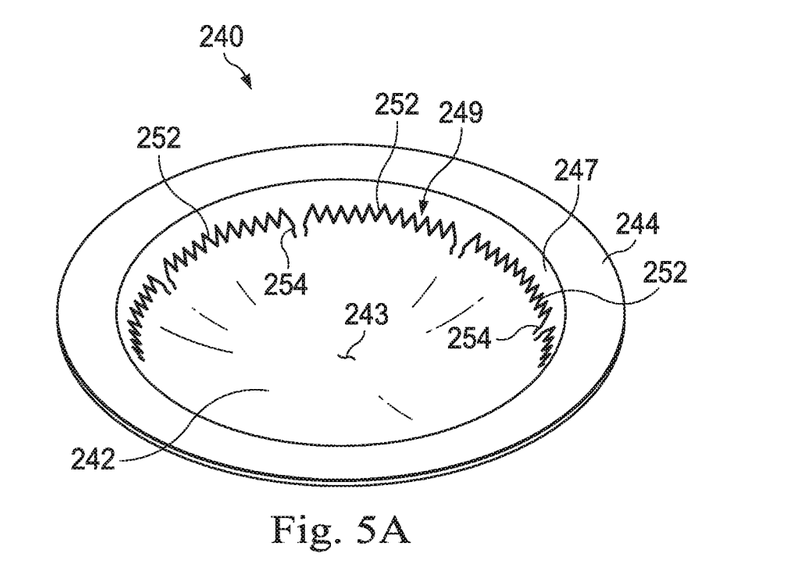
FIG. 5A is a perspective view of one embodiment of a rupture disk for incorporation into the rupture disk assembly in accordance with the teachings herein.
Figure 5B:
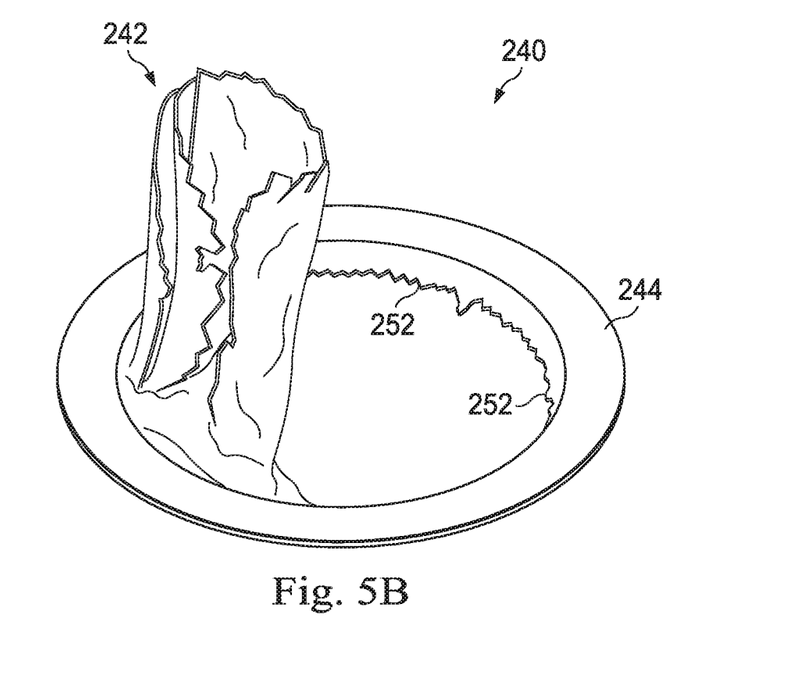
FIG. 5B is a perspective view of a ruptured rupture disk of FIG. 5A.

Although in some embodiments, downwardly facing domed rupture disk 240 is not limited to a particular type, FIGS. 5A and 5B illustrate a domed rupture disk 240 that is particularly suited to the downwardly facing orientation contemplated by the disclosure. Specifically, in FIGS. 5A and 5B, a score line network 249 is formed along the base 247 of domed portion 242 and spaced apart from apex 243 so that apex 243 is free of any score lines. In particular, the score line network 249 is formed of one or more score line segments 252 extending circumferentially about the base 247. In some embodiments, a plurality of spaced apart score line segments 252 may be provided, as shown in FIG. 5A. Although the score line segments 252 are not limited to a particular shape, in one or more embodiments, the score line segments 252 are serrated. In one or more embodiments, a plurality of serrated score line segments 252 are provided with a score line hinge 254 extending from each score line segment 252 towards the apex 243 of dome portion 242. In one or more embodiments, each score line segment 252 includes a score line hinge 254 at each end of the score line segment 252. In one or more embodiments, score line hinges 254 may be spaced apart from one another at the ends of adjacent serrated score line segments 252. When sufficient fluid pressure is placed on the convex side 248 of domed rupture disk 240, domed rupture disk 240 will rupture and tear along at least a portion of the score line network 249 formed along the base 247 of domed portion 242, pushing domed portion 242 into bore 234b. Thus, score line hinges 254 allow rupture disk 240 to fold back on itself in the direction of the flow arrow F (see FIG. 5B), so as not to impede flow as would prior art rupture disks with tear lines formed in the domed portion of the rupture disk. Moreover, as the tear progresses along serrated score line segments 252 upon a rupture, the score line hinges 254 function to interrupt progression of the tear as the tear force on rupture disk 240 diminishes.

Figure 6A:
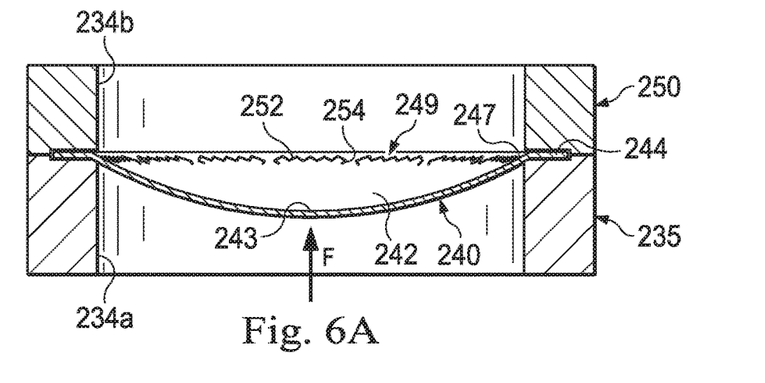
FIG. 6A is a cut-away side elevation view of a rupture disk assembly in accordance with the teachings herein.
Figure 6B:
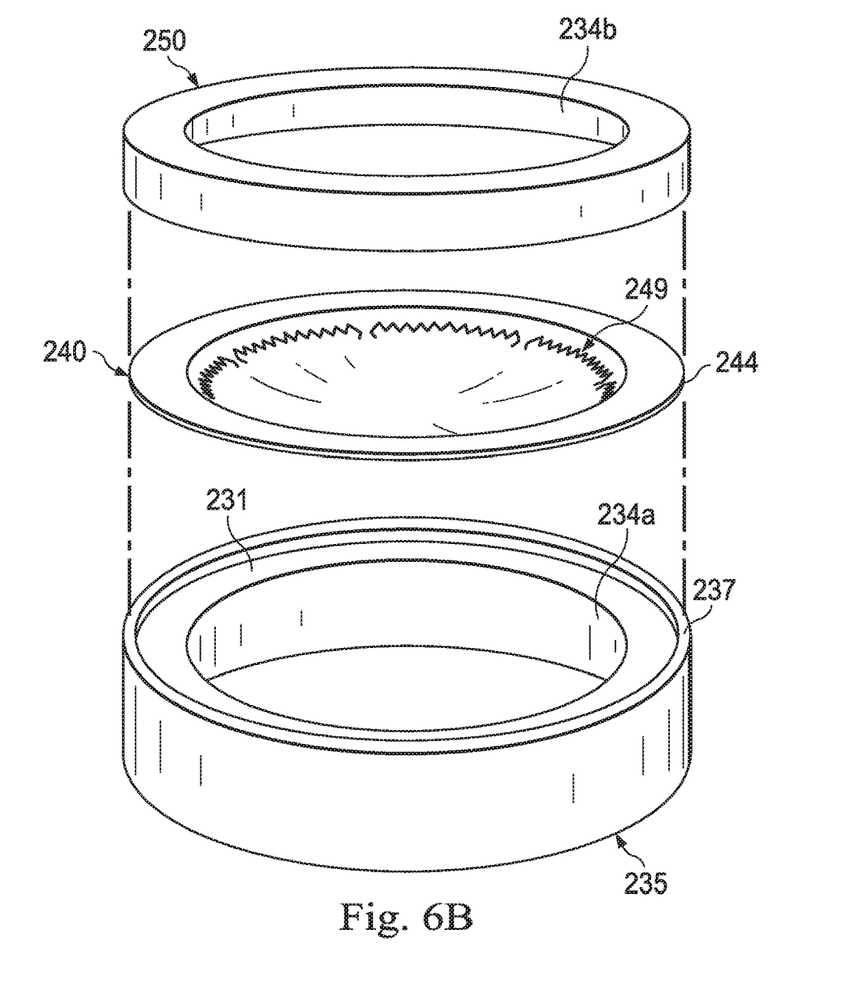
FIG. 6B is an exploded perspective view of a rupture disk assembly in accordance with the teachings herein.

With reference to FIGS. 6A and 6B, disk cartridge assembly 230 is illustrated with an embodiment of the rupture disk 240 described in FIG. 5A. Thus, as shown, rupture disk 240 is disposed between a lower disk support plate 235 and an upper disk support plate 250 so that domed portion 242 of rupture disk 240 extends into bore 234a of lower disk support plate 235. Upper plate 250 abuts lower disk support plate 235 to engage retention portion 244 of rupture disk 240. In this regard, retention portion 244 may seat in a recess 231 formed in the upper surface 237 of lower disk support plate 235. As shown, score line network 249 is formed in domed portion 242 so as to be spaced apart from apex 243 such that domed portion 242 of rupture disk 240 is free of score line network 249 at apex 243, but rather, score line network 249 only extends circumferentially along the base 247 of domed portion 242. Score line network 249 includes one or more serrated score line segments 252 with score line hinges 254 extending from the score line segments 252 towards the apex 243 of dome portion 242.

Embodiments have been described in terms of rapidly relieving fluid pressure within a main fluid filled tank of electrical transformer system 10, so as to reduce the risk of overpressurization. However; it will be appreciated that embodiments can be used for other components of electrical transformer system 10, including without limitation bushing turrets, on load tap changers, and oil filled cable boxes.

Thus, a depressurization system for an electrical transformer has been described. Embodiments of the depressurization system may generally include a rupture disk housing assembly having a container with an opening, a first flange attached to the container, a second flange attached to the container; and a rupture disk cartridge having a lower disk support plate with a bore formed therein; a upper disk support plate with a bore formed therein; a rupture disk having a downwardly facing domed portion with a concave side and convex side; the domed portion characterized by an apex and a base, the rupture disk including a retention portion surrounding the domed portion adjacent the base, wherein the rupture disk clamped between the lower disk support plate and the upper disk support plate so that the domed portion of the rupture disk extends into the bore of the lower disk support plate; wherein the rupture disk cartridge is disposed within the container of the rupture disk housing. Other embodiments of the depressurization system may include a rupture disk housing assembly having a container with an opening, a first flange attached to the container, a second flange attached to the container; a removable cover enclosing the opening; and a rupture disk cartridge having a lower disk support plate with a bore formed therein; a upper disk support plate having a bore formed therein; a rupture disk having a downwardly facing domed portion with a concave side and convex side, the domed portion characterized by an apex and a base, the rupture disk including a retention portion surrounding the domed portion adjacent the base, with a score line network extending circumferentially around the domed portion of rupture disk adjacent the base and spaced apart from the apex, the score line network having a plurality of score line segments, wherein the rupture disk clamped between the lower disk support plate and the upper disk support plate so that the domed portion of the rupture disk extends into the bore of the lower disk support plate, wherein the rupture disk cartridge is disposed within the container of the rupture disk housing. Relatedly, embodiments of transformer system have been described and may include an electrical transformer having a chamber in which a magnetic core and electrical conductors are disposed in a coolant, the chamber having an outlet defined therein; and a depressurization system in fluid communication with the outlet of the electrical transformer, the depressurization system having a first pipe section extending from the outlet so as to form a flowpath therebetween; a second pipe section in fluid communication with the first pipe section; and a rupture disk having a downwardly facing domed portion with a concave side and convex side, the domed portion characterized by an apex and a base, the rupture disk including a retention portion surrounding the domed portion adjacent the base, wherein the rupture disk is positioned between the first pipe section and the second pipe section so that the domed portion of the rupture disk extends toward the first pipe section and electrical transformer outlet so that the convex side of the rupture disk is in fluid communication with the flowpath between the first pipe section and the chamber. Other embodiments of a transformer system may include an electrical transformer having a chamber in which a magnetic core and electrical conductors are disposed in a coolant, the chamber having an outlet defined therein; and a depressurization system in fluid communication with the outlet of the electrical transformer, the depressurization system having a first pipe section extending from the outlet; a second pipe section in fluid communication with the first pipe section; and a rupture disk having a downwardly facing domed portion with a concave side and convex side, the domed portion characterized by an apex and a base, the rupture disk including a retention portion surrounding the domed portion adjacent the base, with a score line network extending circumferentially around the domed portion of rupture disk adjacent the base and spaced apart from the apex, the score line network having a plurality of score line segments, wherein the rupture disk clamped between the lower disk support plate and the upper disk support plate so that the domed portion of the rupture disk extends into the bore of the lower disk support plate, wherein the rupture disk is positioned between the first pipe section and the second pipe section so that the domed portion of the rupture disk extends toward the first pipe section and electrical transformer outlet.

For any one of the foregoing embodiments, the following elements may be combined alone or in combination with other elements:

The removable cover forms part of the rupture disk cartridge.

The removable cover is attached to the lower disk support plate.

The first pipe section is linear.

The first pipe section is approximately five feet or less in length.

A gate valve positioned between the rupture disk and the first pipe section.

First linear pipe section extends from an upwardly facing surface of the chamber.

The rupture disk assembly is in close proximity to an upwardly facing surface of the chamber.

The rupture disk cartridge is pre-assembled outside the rupture disk housing assembly.

The opening has a first height and a first width, wherein the first height is at least equal to a height of the rupture disk cartridge, wherein the first width is at least equal to a diameter of the rupture disk cartridge.

The rupture disk comprises a domed portion and a retention portion.

The lower disk support plate and the upper disk support plate form metal to metal seals with the rupture disk retention portion.

The transformer system of claim 8, wherein the first flange connects to a first pipe section upstream of the depressurization system and the second flange connects to a second pipe section downstream of the depressurization system, wherein the rupture disk cartridge is removable from the rupture disk housing assembly without disconnecting either of the first flange from the first pipe section or the second flange from the second pipe section.

The removable cover forms part of the rupture disk cartridge.

A valve configured to block fluid communication between the electrical transformer and the depressurization system.

A flame suppressor disposed downstream of the depressurization system.

The flame suppressor is oriented substantially horizontally.

The electrical transformer and the depressurization system are disposed inside a structure, wherein the flame suppressor is disposed outside the structure.

The lower disk support plate comprises a base and the upper disk support plate comprises a circular ring.

The upper disk support plate is a ring disposed about an axis with a bore formed through the ring.

The lower disk support plate is a ring disposed about an axis with a bore formed through the ring.

Each disk support plate includes a bore formed therein.

The container is low profile with a container width that is at least twice a height of the container.

The rupture disk is formed about an axis and comprises an upward facing domed portion which is spherical in shape about the axis and a substantially flat retention portion surrounding the domed portion.

The upper disk support plate engages the rupture disk so that the domed portion extends into a bore formed through the upper disk support plate.

The retention portion is clasped between the lower disk support plate and the upper disk support plate so that the axis of the rupture disk aligns with the axis of each bore.

An internal cavity formed within the container.

A through bore formed through housing about a housing axis.

The container is low profile.

The container has a front side in which the opening is formed, an opposing back side and side walls extending between front side and back side, The front side is substantially flat and the back side is semicircular.

The cartridge base has a front side that is substantially flat and an opposing back side that is semicircular in shape.

A substantially horizontal, elongated expansion pipe extending between a first end and a second end with the first end in fluid communication with the rupture disk housing.

A substantially horizontal flame suppressor attached to elongated expansion pipe at the second end.

At least a portion of elongated expansion pipe between the two ends forms an angle with the horizontal that is greater than zero and less than 15 degrees.

A substantially vertical flame suppressor attached to elongated expansion pipe at the second end.

A removable cover enclosing the opening.

The removable cover is attached to the lower disk support plate.

The rupture disk further comprises a score line network extending circumferentially around the domed portion of rupture disk adjacent the base and spaced apart from the apex.

The score line network comprises one or more serrated score segments.

The score line network further comprises one or more hinge score lines extending from the score line segments towards the apex of dome portion.

The lower disk support plate and the upper disk support plate form metal to metal seals with the rupture disk retention portion.

The score line network further comprises a plurality of hinge score line extending from the score line segments towards the apex of dome portion A base supporting lower support plate, wherein the removable wer is attached to the base.

A rupture disk housing assembly having a container with an opening therein to define a cavity, a first flange attached to the container, a second flange attached to the container with a through bore extending between the first flange and the second flange and intersecting the cavity; and a removable cover enclosing the opening, wherein the first flange connects to a first pipe section upstream of the depressurization system and the second flange connects to a second pipe section downstream of the depressurization system, wherein the rupture disk is removable from the rupture disk housing assembly, without disconnecting either of the first flange from the first pipe section or the second flange from the second pipe section.

A valve disposed between the electrical transformer and the depressurization system.

An elongated, substantially horizontal pipe having a first end attached to the second pipe section and a second end to which a flame suppressor is attached.

The flame suppressor is oriented substantially horizontally.

Each score line segment includes two spaced apart hinge score lines.

Hinge score lines may be spaced apart from one another at the ends of adjacent score line segments.

The score line network has a plurality of score line segments.

The score line segments are serrated.

Thus, it is seen that the apparatus of the present invention readily achieves the ends and advantages mentioned as well as those inherent therein. While certain preferred embodiments of the present invention have been illustrated for the purposes of this disclosure, numerous changes in the arrangement and construction of parts may be made by those skilled in the art, which changes are encompassed within the scope and spirit of the present invention as defined by the appended claims.

The invention claimed is:

1. A transformer system comprising:
    an electrical transformer having a chamber in which a magnetic core and electrical conductors are disposed in a coolant, the chamber having an outlet defined therein;
    a depressurization system in fluid communication with the outlet of the electrical transformer, the depressurization system comprising:
        a first pipe section extending from the outlet so as to form a flowpath therebetween;
        a second pipe section in fluid communication with the first pipe section; and
        a rupture disk having a domed portion with a concave side and convex side,
        the domed portion characterized by an apex and a base,
        the rupture disk including a retention portion surrounding the domed portion adjacent the base,
    wherein the rupture disk is positioned between the first pipe section and the second pipe section so that the domed portion of the rupture disk extends toward the first pipe section and electrical transformer outlet so that the convex side of the rupture disk is in fluid communication with the flowpath between the first pipe section and the chamber;
    wherein the rupture disk further comprises at least one score line extending circumferentially around the domed portion of rupture disk adjacent the base and spaced apart from the apex;
    and wherein each score line comprises one or more serrated score line segments having a score line hinge extending from the serrated score line segment towards the apex of dome portion.

2. The transformer system of claim 1, further comprising a rupture disk housing assembly having a container with an opening therein to define a cavity, a first flange attached to the container, a second flange attached to the container with a through bore extending between the first flange and the second flange and intersecting the cavity;
    and a removable cover enclosing the opening, wherein the first flange connects to a first pipe section upstream of the depressurization system and the second flange connects to a second pipe section downstream of the depressurization system, wherein the rupture disk is removable from the rupture disk housing assembly without disconnecting either of the first flange from the first pipe section or the second flange from the second pipe section.

3. The transformer system of claim 2, further comprising at least two serrated score line segments extending circumferentially around the domed portion of rupture disk adjacent the base and spaced apart from the apex, each score line segment having a first end and a second end, wherein the at least two score line segments are positioned so that an end of one score line segment is adjacent an end of the other score line segment, wherein the adjacent ends of the at least two score line segments each have a score line hinge extending from the respective score line segment towards the apex of dome portion so that the score line hinges of the at least two serrated score line segments are adjacent but spaced apart from one another.

4. The transformer system of claim 3, wherein the removable cover is attached to the lower disk support plate.

5. The transformer system of claim 1, further comprising a valve disposed between the electrical transformer and the depressurization system.

6. The transformer system of claim 1, further comprising an elongated pipe extending in the horizontal direction and having a first end attached to the second pipe section and a second end to which a flame suppressor is attached.

7. The transformer system of claim 6, wherein the flame suppressor is oriented to extend in the horizontal direction.

8. The transformer system of claim 1, further comprising a valve disposed between the electrical transformer and the depressurization system.

9. The depressurization system of claim 1, wherein each score line segment has a first end and a second end with a score line hinge extending from each score line segment end towards the apex of dome portion.

10. The depressurization system of claim 9, further comprising a plurality of score lines extending circumferentially around the domed portion of rupture disk adjacent the base and spaced apart from the apex, each of the plurality of score lines comprising at least two at least two serrated score line segments so that the plurality of score lines encircle the base of the domed portion, each serrated score line segment having a first score line hinge and a second score line hinge with each score line hinge of a score line extending from the score line towards the apex of the dome.

11. The depressurization system of claim 10, wherein each of the score line hinges is adjacent to but spaced apart from another score line hinge.

12. The depressurization system of claim 1, wherein the rupture disk further comprises a plurality of score line hinges around the circumference of the base.

13. The transformer system of claim 1, further comprising at least two score lines adjacent the base and spaced apart from the apex, each score line including a score line hinge, with the score line hinge of the at least two score lines adjacent one another.

14. A transformer system comprising:

an electrical transformer having a chamber in which a magnetic core and electrical conductors are disposed in a coolant, the chamber having an outlet defined therein;

a depressurization system in fluid communication with the outlet of the electrical transformer, the depressurization system comprising:

a first pipe section extending from the outlet;

a second pipe section in fluid communication with the first pipe section;

a rupture disk having a domed portion with a concave side and convex side, the domed portion characterized by an apex and a base, the rupture disk including a retention portion surrounding the domed portion adjacent the base, with a plurality of serrated score line segments extending circumferentially around the domed portion of rupture disk adjacent the base and spaced apart from the apex, wherein the convex side of the domed portion of the rupture disk being exposed to the coolant within the chamber;

and wherein each score line segment has a first end and a second end with a score line hinge extending from each end of a score line segment towards the apex of the dome.

15. The transformer system of claim 14, further comprising a lower disk support plate having a bore formed therein and adjacent the first pipe section;

an upper disk support plate having a bore formed therein and adjacent the second pipe section;

wherein the rupture disk is clamped between the lower disk support plate and the upper disk support plate so that the domed portion of the rupture disk extends into the bore of the lower disk support plate;

and a rupture disk housing assembly having a container with an opening therein to define a cavity, a first flange attached to the container, a second flange attached to the container with a through bore extending between the first flange and the second flange and intersecting the cavity;

and a removable cover enclosing the opening, wherein the first flange connects to a first pipe section upstream of the depressurization system and the second flange connects to a second pipe section downstream of the depressurization system, wherein the rupture disk is removable from the rupture disk housing assembly without disconnecting either of the first flange from the first pipe section or the second flange from the second pipe section.

16. The transformer system of claim 15, further comprising a removable cover enclosing the opening.

17. The transformer system of claim 16, wherein the removable cover is attached to the lower disk support plate.

18. The transformer system of claim 14, further comprising a valve disposed between the electrical transformer and the depressurization system.

19. The transformer system of claim 14, further comprising an elongated pipe extending in the horizontal direction, the elongated pipe having a first end attached to the second pipe section and a second end to which a flame suppressor is attached.

20. The transformer system of claim 19, wherein the flame suppressor is oriented to extend in the horizontal direction.

21. The transformer system of claim 14, wherein at least two score line segment ends are adjacent one another so that the score line hinges of adjacent score line ends are spaced apart from one another at the adjacent ends of the score line segments.

22. The transformer of claim 14, further comprising a lower disk support plate having a bore formed therein and adjacent the first pipe section; an upper disk support plate having a bore formed therein and adjacent the second pipe section;
  wherein the rupture disk is clamped between the lower disk support plate and the upper disk support plate so that the domed portion of the rupture disk extends into the bore of the lower disk support plate; and wherein the bore of the lower disk support has a height H1 and the domed portion of the rupture disk has a dome height HD1 as measured from the base of the rupture disk, wherein the height H1 of the bore is greater than the dome height HD1.

23. A transformer system comprising:
an electrical transformer having a chamber in which a magnetic core and electrical conductors are disposed in a coolant, the chamber having an outlet defined therein;
a depressurization system in fluid communication with the outlet of the electrical transformer, the depressurization system comprising:
a first pipe section extending from the outlet;
a second pipe section in fluid communication with the first pipe section;
a lower disk support plate having a bore formed therein and adjacent the first pipe section;
an upper disk support plate having a bore formed therein and adjacent the second pipe section;
a rupture disk having a domed portion with a concave side and convex side,
the domed portion characterized by an apex and a base,
the rupture disk including a retention portion surrounding the domed portion adjacent the base, with at least one score line extending circumferentially around the domed portion of rupture disk adjacent the base and spaced apart from the apex,
wherein the rupture disk is clamped between the lower disk support plate and the upper disk support plate so that the domed portion of the rupture disk extends into the bore of the lower disk support plate,
and the convex side of the rupture disk extends toward the first pipe section and electrical transformer outlet and is exposed to the coolant,
wherein the rupture disk further comprises at least one score line extending circumferentially around the domed portion of rupture disk adjacent the base and spaced apart from the apex;
and wherein each score line comprises one or more serrated score line segments having at least two score line hinges extending from the serrated score line segment towards the apex of dome portion.

* * * * *